(12) United States Patent
McCullough

(10) Patent No.: US 8,432,298 B2
(45) Date of Patent: Apr. 30, 2013

(54) AIRCRAFT VISUAL DISPLAY SYSTEM WITH DIRECT PAGE NAVIGATION

(75) Inventor: Sue McCullough, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 678 days.

(21) Appl. No.: 12/609,963

(22) Filed: Oct. 30, 2009

(65) Prior Publication Data

US 2011/0102199 A1  May 5, 2011

(51) Int. Cl.
*G01C 21/00* (2006.01)
(52) U.S. Cl.
USPC ............ 340/979; 340/945; 340/971; 340/973
(58) Field of Classification Search .................. 340/979, 340/945, 971, 973, 974, 977, 978; 701/206
See application file for complete search history.

(56) References Cited

U.S. PATENT DOCUMENTS

| | | | |
|---|---|---|---|
| 5,340,061 A | 8/1994 | Vaquier et al. | |
| 5,828,373 A * | 10/1998 | Yves | 715/763 |
| 5,844,503 A | 12/1998 | Riley et al. | |
| 6,112,141 A | 8/2000 | Briffe et al. | |
| 6,542,796 B1 | 4/2003 | Gibbs et al. | |
| 6,618,652 B2 * | 9/2003 | Lafon et al. | 701/3 |
| 6,633,810 B1 | 10/2003 | Qureshi et al. | |
| 6,856,864 B1 | 2/2005 | Gibbs et al. | |
| 6,980,198 B1 | 12/2005 | Gyde et al. | |
| 7,250,934 B2 | 7/2007 | Roux | |
| 7,257,469 B1 * | 8/2007 | Pemble | 701/3 |
| 7,376,582 B2 | 5/2008 | Seet et al. | |
| 7,415,666 B2 | 8/2008 | Sellers et al. | |
| 7,418,319 B2 * | 8/2008 | Chen et al. | 701/14 |
| 7,509,585 B1 | 3/2009 | Gauthier et al. | |
| 7,512,892 B2 | 3/2009 | Sellers et al. | |
| 7,538,781 B2 | 5/2009 | Gyde et al. | |
| 7,580,235 B2 | 8/2009 | Hamasaki et al. | |
| 2003/0093187 A1 | 5/2003 | Walker | |
| 2007/0046680 A1 | 3/2007 | Hedrick et al. | |
| 2007/0061755 A1 | 3/2007 | Taboada et al. | |
| 2008/0119969 A1 | 5/2008 | McCullough et al. | |
| 2009/0125222 A1 * | 5/2009 | McCullough et al. | 701/120 |

FOREIGN PATENT DOCUMENTS

| | | | |
|---|---|---|---|
| EP | 1701255 A1 | 9/2006 | |
| WO | 2005041033 A2 | 5/2005 | |

\* cited by examiner

*Primary Examiner* — Toan N Pham
(74) *Attorney, Agent, or Firm* — Ingrassia Fisher & Lorenz, P.C.

(57) ABSTRACT

A visual display system is provided for an aircraft having a flight plan with a plurality of flight plan pages. The system includes a display unit configured to display at least one of the flight plan pages; an input device configured to receive an input from a user corresponding to a selected flight plan page from the plurality of flight plan pages; and a processor coupled to the monitor and the input device. The processor is configured to receive the input from the input device and provide the selected flight plan page to the display unit for display based on the input.

13 Claims, 3 Drawing Sheets

AIRCRAFT VISUAL DISPLAY SYSTEM WITH DIRECT PAGE NAVIGATION

FIELD OF THE INVENTION

The present invention generally relates to a visual display system for an aircraft, and more particularly, the present invention relates to a visual display system that produces a display with direct page navigation.

BACKGROUND

Aircraft and aircraft systems continue to advance in sophistication. Flight management systems are used on aircraft to integrate information from data sources and to perform, or assist a user in performing, functions related to, for example, navigation, flight planning, guidance and navigation, and performance management. Many aircraft have a visual display system, such as a Multifunction Control Display Unit (MCDU), coupled to the flight management system that displays a number of different screen pages in which the user can obtain information or perform functions. For example, the flight management system can display a flight plan on the MCDU.

MCDUs may be problematic in that, generally, a user must scroll through a number of screen pages to obtain a desired portion of a flight plan or other type of information. This can be an issue because flight plans can be over 40 pages and require long sequential navigations to arrive at the desired page. This process of viewing desired information may be time consuming and inefficient, particularly because certain users often seek a particular screen page.

Accordingly, it is desirable to provide an aircraft visual display system on which desired screen pages, particularly flight plan portions, are efficient and easy to view. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a visual display system is provided for an aircraft having a flight plan with a plurality of flight plan pages. The system includes a display unit configured to display at least one of the flight plan pages; an input device configured to receive an input from a user corresponding to a selected flight plan page from the plurality of flight plan pages; and a processor coupled to the monitor and the input device. The processor is configured to receive the input from the input device and provide the selected flight plan page to the display unit for display based on the input.

In accordance with an exemplary embodiment, a method is provided for navigating to a selected flight plan page of a flight plan on a multifunctional control display unit (MCDU). The method includes receiving an input indicating the selected flight plan page; and displaying the selected flight plan page in a visual display of the MCDU.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Broadly, exemplary embodiments described herein include an aircraft visual display system with a display unit such as a multifunctional control display unit (MCDU). In accordance with an exemplary embodiment, the system enables direct page navigation of the flight plans on the MCDU. For example, a user enters a desired waypoint on the keyboard of the MCDU, and upon pressing a key such as the FPL key, the MCDU displays the flight plan page associated with that waypoint.

Figure 1:
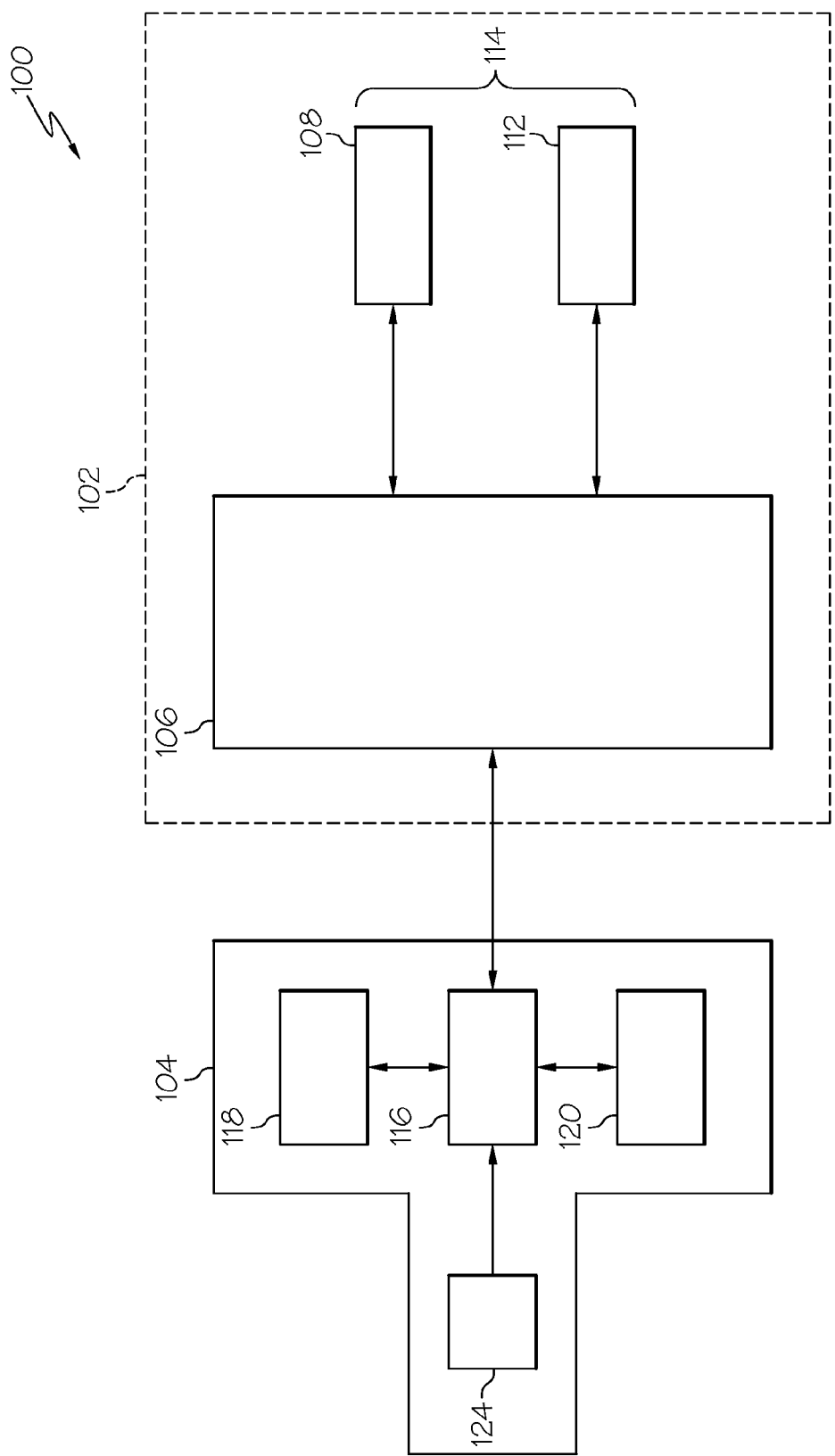
FIG. 1 is a schematic representation of an aircraft system with a visual display system in accordance with an exemplary embodiment.

FIG. 1 is a schematic representation of an aircraft system 100 with a visual display system 104 coupled to a flight management system (FMS) 102. The visual display system 104 includes a processor 116 coupled to a memory 118 and a multifunction monitor, unit, or display, such as a multifunction control display unit (MCDU) 120. The MCDU 120 displays information from the FMS 102 and enables user interaction with the FMS 102 via input devices such as a keyboard, as discussed in greater detail below. The processor 116 can be a graphics generator that generates a display on the MCDU 120 based on data stored in the memory 118 and received from the FMS 102. The visual display system 104 may further include a microphone 124 that enables audio interaction between the user, the MCDU 120, and the FMS 102. The microphone 124 may be incorporated into a headset worn by the user.

In general, the MCDU 120 may include one or more display monitors suitable for displaying various symbols and information. The MCDU 120 can include display devices such as, for example, cathode ray tube (CRT), liquid crystal display (LCD), Heads Up Display (HUD), and Helmet Monitored Display (HMD). The MCDU 120 is preferably interactive, and as such, includes a keyboard, touch-screen and/or other mechanisms for function, display, and/or cursor control. The MCDU 120 is discussed in greater detail below with reference to FIGS. 2 and 3.

The processor 116 encompasses one or more functional blocks used to interact with the FMS 102, memory 118, microphone 124, and MCDU 120. In this regard, processor 116 may include any number of individual microprocessors, memories, storage devices, interface cards, and other components. The memory 118 can be any suitable type of memory or data storage, such as for example, RAM, ROM, EEPROM, flash memory, CD, DVD, or other optical storage, magnetic storage devices, or any other medium that can be used to store and access desired information by the processor 116. As discussed in greater detail below, the memory 118 may store logic that enables direct page navigation of the flight plan on the MCDU 120.

The FMS 102 includes an FMS processor 106. The FMS processor 106 is configured to communicate with the visual display system 104 and one or more data sources 114. Similar to the display system processor 116, the FMS processor 106 may include any number of individual microprocessors, memories, storage devices, interface cards, and other components.

The data sources 114 can include avionics data 108 and at least one airline modifiable information (AMI) file 112. Avionics data 108 includes aeronautical information related to the state of the aircraft derived from an aeronautical information database, including, for example, flight plan data, data related to airways, navigational aids, navigational data, obstructions, taxi registration, Special Use Airspace, political boundaries, COM frequencies (en route and airports), approach information, geographical information and the like.

The FMS 102 integrates information from data sources 114 shown in FIG. 1, as well as additional data sources such as input from the pilot or other users, inertial references, navigation radio, and engine and fuel sensors, to perform or assist in functions such as navigation, flight planning, performance management, guidance and control, datalink communications, and display data processing. Particularly, the FMS 102 utilizes the data from the AMI file 112 to provide runtime parameters to the visual display system 104.

The processor 116 of the visual display system 104 receives the runtime parameters provided by the FMS 102 to produce a display on the MCDU 120. Through the use of the MCDU 120, microphone 124, or other peripherals of the visual display system 104, the user can interact with the elements displayed on the MCDU 120 graphically and/or textually.

Figure 2:
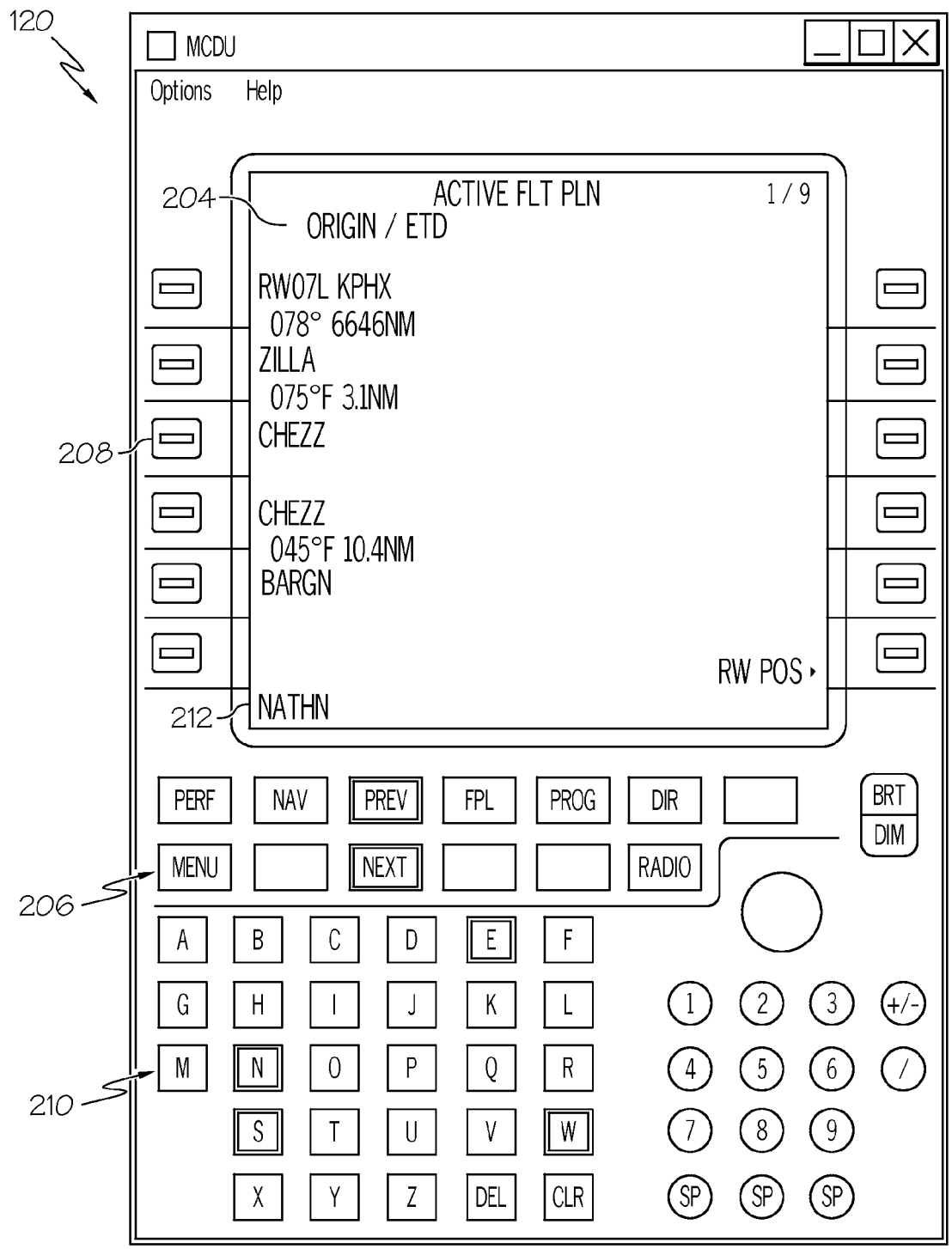
FIG. 2 is a view of multifunction control display unit of the visual display system of FIG. 1 displaying a first flight plan page.
Figure 3:
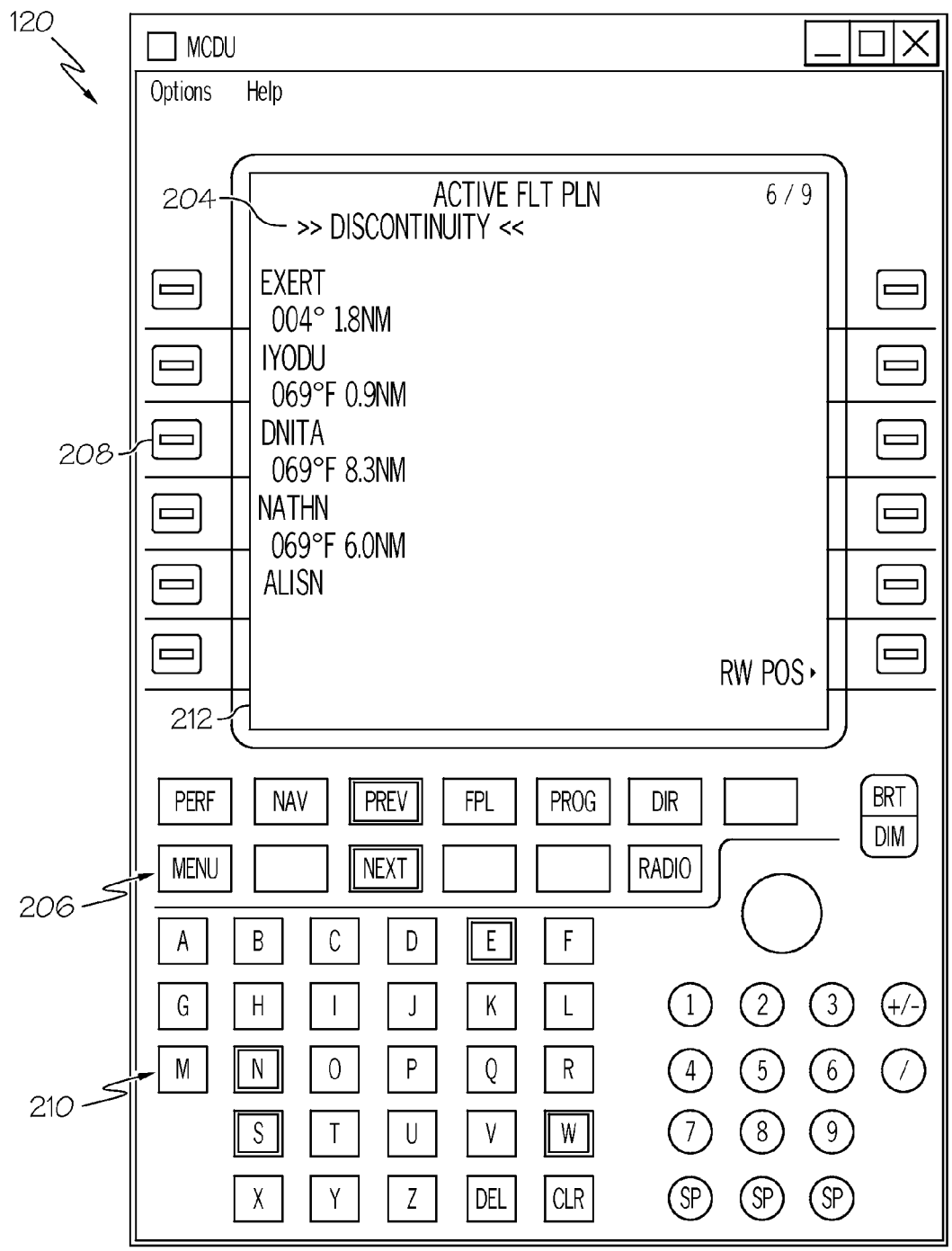
FIG. 3 is a view of multifunction control display unit of FIG. 2 displaying a second flight plan page.

FIG. 2 is a view of the MCDU 120 of the visual display system 104 of FIG. 1 displaying a first flight plan page, and FIG. 3 is a view of the MCDU 120 displaying a second flight plan page. Referring to both FIGS. 2 and 3, the MCDU 120 includes a display portion 204 for displaying a current screen page that includes information relating to navigation and control of the aircraft. As shown in FIG. 2, the current screen page in the display portion 204 is an active flight plan page. In general, a flight plan is a detailed description of the path to be followed by an aircraft during a scheduled flight. In particular, the flight plan is a chronological sequence of waypoints described by their name, their position, their altitude and the time they are overflown or sequenced. Characteristics of the flight plan and display of the list of waypoints will be discussed in greater detail below.

The current screen page in the display portion 204 can be changed or manipulated by pressing one or more mode keys 206. The mode keys 206 are each associated with one or more screen pages or functions that can be displayed in the display portion 204. Line select keys 208 along the side of the display portion 204 enable the user to perform functions, with mode key selected, that include associated with the navigation and control of the aircraft specific to the screen page displayed in the display portion 204. For example, the line select keys 208 allow the user to navigate the screens, enter flight plan data, performance data, and navigation data, as well as initiating functions such as printing the flight plan and aligning the inertial reference system.

A multifunction keyboard 210 is formed by a keypad device that includes, for example, the alphabet, numbers from zero to nine, mathematical operator keys, decimal, clear, delete, space, etc. Moreover, the multifunction keyboard 210 may include any number of additional knobs, switches, buttons, keys, and the like, all of which may be configured to implement an effective interface between the user and the FMS 102 (FIG. 1).

The MCDU 120 further includes a scratchpad area 212. The scratchpad area 212 may be, for example, part of the display portion 204 or any other suitable electronic display device. The scratchpad area 212 generally operates to display the data being entered into the multifunction keyboard 210 by the user, such that the user may monitor the data for accuracy as it is being typed.

In the example illustrated in FIG. 2, the MCDU 120 displays the first page of a nine page flight plan. In this example, the first page of the active flight plan lists five waypoints, e.g., "ZILLA", "CHEZZ," and so on. In some embodiments, the flight plans may be 40 or more pages. In conventional MCDUs, if a user wanted to, for example, view a waypoint that was not displayed on the first page, the user would have to press the NEXT key of the mode keys 206. Pressing the NEXT key sequentially scrolls through the pages of the flight plan. The user would continually scroll through the flight plan pages and scan the listed waypoints, until the user identifies the desired waypoint.

In accordance with an exemplary embodiment, the user may request a particular page of the flight plan by entering the request into the multifunction keyboard 210. For example, if the user wants to view the flight plan page that includes the waypoint "NATHN," the user types the phrase "NATHN" into the multifunction keyboard 210, and the phrase is displayed in the scratchpad area 212 of the display portion 204. The user then presses the FPL key of the mode keys 206. In an alternate embodiment, other mode keys or actuating functions may be used. In response, the MCDU 120 displays the flight plan page that includes the "NATHN" waypoint. As shown in the exemplary embodiment of FIG. 3, the "NATHN" waypoint is included on page six of the flight plan. As such, the MCDU 120 jumps directly to a non-sequential, desired flight plan page with a single command instead of requiring the user to scroll through a number of pages.

In another exemplary embodiment, it is not necessary for the user to enter the complete waypoint to jump to a desired flight plan page. For example, if the user enters "NAT," and no other waypoints in flight plan start with "NAT," the MCDU 120 will jump to the flight plan page with the "NATHN" waypoint. In some embodiments, the MCDU 120 may provide a selection of waypoints in a drop down menu. For example, if the user enters "N" into the scratchpad and presses the FPL key, the MCDU 120 displays all of the waypoints on the flight plan page that begin with the letter "N." The user then selects the desired "NATHN" waypoint from the menu, and the MCDU 120 displays the flight plan page with the "NATHN" waypoint.

Accordingly, direct page navigation is accessible according to waypoint name. Referring additionally to FIG. 1, in general, the processor 102 uses page logic within the memory 118 of the display system 104 that contains a flight plan list from which the waypoint names can be sorted to identify the appropriate flight plan page. If necessary, the processor 106 of the FMS 102 can query lateral path construction and database management to assist in direct page navigation.

In further exemplary embodiments, the MCDU 120 responds to further user commands, such as those that indicate a desired page position within the flight plan. For example, if the user types the phrase "MID" into multifunction keyboard 210 and presses the FPL key, the MCDU 120 displays the midpoint of the flight plan, e.g., page five of the nine page flight plan. As another example, if the user types the phrase "END" into multifunction keyboard 210, which is displayed in scratchpad 212, and presses the FPL key, the MCDU 120 displays the last page of the flight plan, e.g., page nine of the nine page flight plan. In a further exemplary embodiment, if the user types a page number into the multifunction keyboard 210 and presses the FPL key, the MCDU 120 displays the requested page. For example, if the user types "6" and presses the FPL key, the MCDU 120 displays page six of the flight plan. As another example, if the user types the phrase "DISCON" into multifunction keyboard 210, which is displayed in scratchpad 212, and presses the FPL key, the MCDU 120 displays the flight plan page that contains a discontinuity in the flight plan. If the user attempts to go to a waypoint or command display screen that is not part of the flight plan, such a data entry would be rejected by the MCDU 120 and the previously displayed data would remain unchanged.

As an alternative or in addition to using the multifunction keyboard 210 and mode or line select keys 206, 208, the user may input instructions via the microphone 124 (FIG. 1). The user can activate the MCDU 120 to receive audio instructions via a designated keystroke or other physical input or a predetermined audible command. The MCDU 120 may provide a visible indication that the visual display system 104 is in audio mode.

The processor 116 may execute a speech recognition program that translates the speech into digital signals representing text. The digital signals may then be used as the alphanumeric entry on the scratchpad area 212 to direct the MCDU 120 to the desired page. In other embodiments, the spoken command itself is not displayed.

In one embodiment, the user can spell out the desired waypoint, such as "N," then "A," and so on, using the example of FIG. 2. In an alternate embodiment, the user can request the desired waypoint itself, such as "NATHN." Additionally, the user can speak or spell the other designated commands, such as "MID," "END," or "DISCON." In each of these uses, the processor 116 identifies the appropriate page corresponding to the designated waypoint or command and displays this page.

In one exemplary embodiment, designated commands such as those discussed above are stored in an AMI data table that forms part of the AMI file 112 or a data table stored in memory 118, as illustrated by FIG. 1. In other words, text commands, such as "MID," "END," and numeric commands are page mapped with a text list that identifies designated flight plan pages. In these cases, the user may utilize a ground based software tool (GBST) or user application definition files (UADF) to modify the display and function of the MCDU 120, including the accessible text commands Typically, the FMS 102 reads the data in the AMI file 112 and provides runtime parameters to the visual display system 104, which enables the MCDU 120 to directly navigate desired flight plan pages. In general, any suitable mechanism for linking MCDU inputs with flight plan pages may be provided.

Accordingly, exemplary embodiments enable direct page navigation of the flight plans on the MCDU. This permits the aircraft operator to focus on the task of appropriately routing the aircraft instead of focusing on scrolling through the flight plan pages of the MCDU. As such, exemplary embodiments decrease flight crew "heads-down" time, ease pilot workload, and improve the efficiency with which pilots operate their aircraft.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A visual display system for an aircraft having a flight plan with a plurality of flight plan pages, the system comprising:
    a display unit configured to display at least one of the flight plan pages;
    an input device configured to receive an input from a user corresponding to a selected flight plan page from the plurality of flight plan pages, wherein the input device is a keyboard that receives the input as text from the user; and
    a processor coupled to the display unit and the input device, the processor configured to receive the input from the input device and provide the selected flight plan page to the display unit for display based on the input,
    wherein the input corresponds to a waypoint of the flight plan and the processor is configured to display the selected flight plan page that includes the waypoint.

2. The visual display system of claim 1, wherein the input device and display unit form a portion of a multifunctional control display unit (MCDU).

3. The visual display system of claim 1, wherein the display unit is configured to display the text representing the input.

4. The visual display system of claim 1, wherein the input is a complete waypoint name.

5. The visual display system of claim 1, wherein the input is a partial waypoint name.

6. The visual display system of claim 1, further comprising memory configured to store a data table that links the inputs with the flight plan pages.

7. A visual display system for an aircraft having a flight plan with a plurality of flight plan pages, the system comprising:
    a display unit configured to display at least one of the flight plan pages;
    an input device configured to receive an input from a user corresponding to a selected flight plan page from the plurality of flight plan pages, wherein the input device is a keyboard that receives the input as text from the user; and
    a processor coupled to the display unit and the input device, the processor configured to receive the input from the input device and provide the selected flight plan page to the display unit for display based on the input,
    wherein the input corresponds to a position within the flight plan and the processor is configured to display the selected flight plan page that corresponds to the position.

8. The visual display system of claim 7, wherein the position is a midpoint of the flight plan.

9. The visual display system of claim 7, wherein the position is the end of the flight plan.

10. The visual display system of claim 7, wherein the position is a flight plan page number.

11. A method for navigating to a selected flight plan page of a flight plan on a multifunctional control display unit (MCDU), the method comprising:
    receiving a text input on a keyboard indicating the selected flight plan page; and
    displaying the selected flight plan page in a visual display of the MCDU, wherein the receiving step includes receiving the input that comprises a position within the flight plan.

12. The method of claim 11, wherein the receiving step includes receiving the input that comprises a waypoint name.

13. The method of claim 11, wherein the receiving step includes receiving the input that comprises a flight plan page number.

* * * * *